United States Patent [19]
Smith

[11] 3,852,240
[45] Dec. 3, 1974

[54] RAPID SETTING FORMALDEHYDE-EPOXY RESIN COMPOSITIONS
[75] Inventor: Harry A. Smith, Midland, Mich.
[73] Assignee: The Dow Chemical Company, Midland, Mich.
[22] Filed: Jan. 18, 1973
[21] Appl. No.: 324,738

[52] U.S. Cl............ 260/47 EP, 252/182, 260/2 EP, 260/2 N, 260/29.2 EP, 260/33.2 EP, 260/33.4 EP, 260/47 EN, 260/49, 260/51 EP, 260/59
[51] Int. Cl...................... C08g 30/04, C08g 30/14
[58] Field of Search ....... 260/2 N, 2 EC, 51 EP, 59, 260/49, 47 EN, 47 EG, 51.5, 29.2 EP, 33.4 EP; 252/182, 67 R, 67 FP, 830, 72 R

[56] References Cited
OTHER PUBLICATIONS
Chem. Abstract, Vol. 55, p. 25363 b, 1964.
Chem. Abstract, Vol. 68, p. 31182 u, 1968.

*Primary Examiner*—William H. Short
*Assistant Examiner*—T. Pertilla
*Attorney, Agent, or Firm*—Benjamin G. Colley

[57] ABSTRACT

The ambient curing of glycidyl ether type epoxy resins with primary amines is accelerated by the addition of formaldehyde to the curable mixture.

10 Claims, No Drawings

RAPID SETTING FORMALDEHYDE-EPOXY RESIN COMPOSITIONS

This invention relates to curable epoxy resin compositions having increased cure rates.

It is well known in the epoxy resin art that the cure rates of epoxy resins cured with primary amines can be increased or accelerated somewhat with compounds having aromatic hydroxyl groups such as, for example, phenols and the like.

It has now been unexpectedly discovered that small amounts of formaldehyde can be employed to increase the room temperature cure rate of epoxy resins cured with primary amines.

The compositions of the present invention comprise
A. an epoxy resin of the glycidyl ether type,
B. an aliphatic or aromatic primary amine-containing compound, and
C. formaldehyde, or a linear or cyclic polymer thereof, or an adduct of formaldehyde and a compound containing a plurality of aliphatic hydroxyl group, wherein the weight ratio of A:B is from about 0.3:1 to about 3:1 and preferably from about 1.3:1 to about 2:1 and wherein the weight ratio of epoxy:formaldehyde contained in component C is from about 3.6:1 to about 36:1 and preferably from about 9:1 to about 18:1.

The present invention also concerns a storage stable epoxy resin composition comprising
A. an epoxy resin having an average of more than one glycidyl ether group per molecule, and
B. formaldehyde or a linear or cyclic polymer thereof capable of releasing formaldehyde at a temperature below about 50°C;

wherein the weight ratio of A:B is from about 3.6:1 to about 36:1 and preferably from about 9:1 to about 18:1.

The present invention also concerns an improved process in the ambient temperature curing of epoxy resins having an average of more than one glycidyl ether group per molecule with a compound having more than one primary amine group per molecule, the improvement comprising adding to the curable mixture formaldehyde or a linear or cyclic polymer thereof or an adduct of formaldehyde and a compound containing a plurality of aliphatic hydroxyl groups.

Suitable primary amine-containing compounds include aliphatic amines such as, for example, ethylenediamine, diamino propane, diethylenetriamine, triethylenetetramine, tetraethylenepentamine, aromatic amines such as, for example, diaminobenzene, methylene dianiline, mixtures thereof and the like.

The formaldehyde or linear or cyclic polymer thereof or an adduct of formaldehyde and a compound containing a plurality of aliphatic hydroxyl groups is usually employed in a suitable solvent including water; alcohols such as, for example, methanol, ethanol, propanol; monoethers of ethylene; and propylene polyglycols.

Any of the well known epoxy resins having an average of more than one glycidyl ether group per molecule are suitably employed in the present invention. Particularly preferred epoxy resins are the liquid epoxy resins. They may be either aliphatic or aromatic epoxy resins, althought the aromatic based epoxy resins are preferred.

Suitable epoxy resins having an average of more than one 1,2-epoxy group per molecule include, for example, those resins represented by the following general formulae:

A.
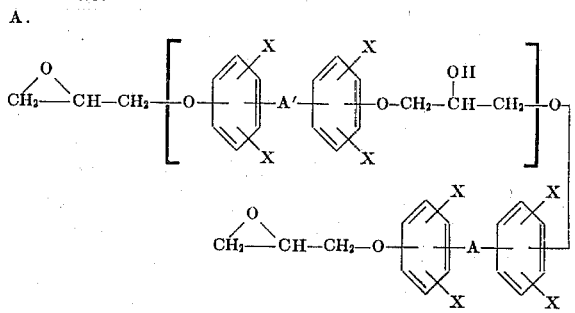

wherein each A' is selected from the group consisting of a divalent hydrocarbon group having from one to four carbon atoms, —S—, —S—S—,

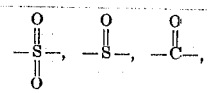

—O—, each. X is independently hydrogen, chloride, or bromine, and $n$ is an integer having an average value of from about 0 to about 10;

B.
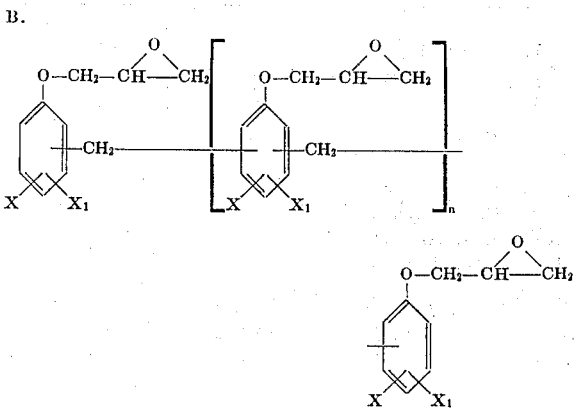

wherein X and $X_1$ are independently selected from the group consisting of hydrogen, an alkyl group having from about 1 to about 4 carbon atoms, and a halogen and $n$ is an integer having an average value of from about 0.1 to about 4;

C.
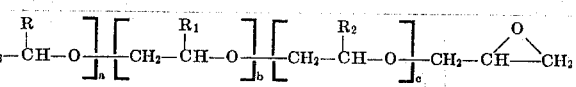

wherein R, $R_1$ and $R_2$ are independently hydrogen, an alkyl or haloalkyl group having from about one to about four carbon atoms, and $a$, $b$, and $c$ are integers, the sum of which is an integer having an average value of from about 3 to about 40;

D.
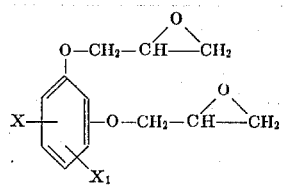

wherein X and $X_1$ are as indicated in formula B above.

E.
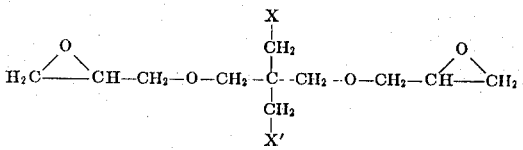

wherein X and X' are independently selected from hydrogen, chlorine and bromine.

F.

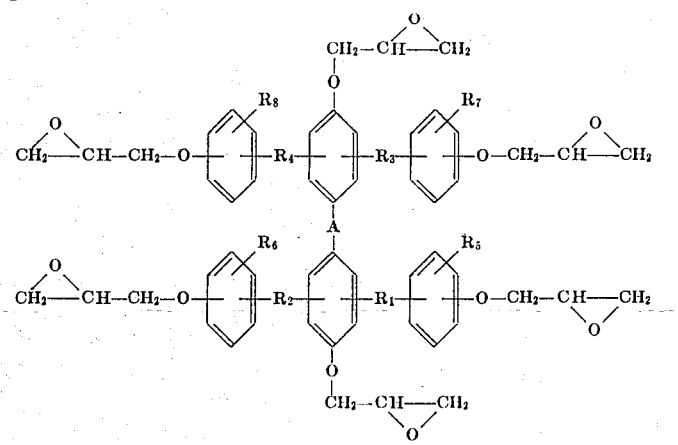

wherein A is a divalent radical selected from the group consisting of alkylidene, cycloalkylidene, —S—, —S—S—,

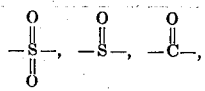

—O—; $R_1$, $R_2$, $R_3$ and $R_4$ are independently alkylidene groups and $R_5$, $R_6$, $R_7$ and $R_8$ are independently hydrogen, halogen or alkyl groups having from one to about four carbon atoms.

Suitable cyclic and linear polymers of formaldehyde are, for example, paraformaldehyde, trioxane, mixtures thereof and the like.

The compositions of the present invention can be modified to contain fillers, modifiers, diluents, and the like without detracting from the scope of the invention.

Suitable adducts of formaldehyde with a compound containing a plurality of aliphatic hydroxyl groups include adducts of formaldehyde with alkylene glycols having from about one to about 10 carbon atoms, polyoxyalkylene glycols such as, for example, polyoxypropylene glycol, polyoxyethylene glycol, polyoxybutylene glycol, glycerine, trimethylol propane, pentaerythritol, sucrose, polyglycols prepared by reacting hydroxyl containing compounds with an alkylene oxide such as, for example, ethylene oxide, 1,2-propylene oxide, 1,2-butylene oxide, epichlorohydrin, mixtures thereof and the like.

These formaldehyde adducts and methods for their preparation are more fully described in my copending application, Ser. No. 885,323, filed Dec. 15, 1969 and such application as it pertains to such adducts and method for their preparation is incorporated herein by reference.

The following examples are illustrative of the present invention and are not to be construed as limiting the scope thereof in any manner.

EXAMPLE 1

Samples were prepared by preparing mixtures containing 5 grams of a diglycidyl ether of bisphenol A having an epoxide equivalent weight (EEW) of about 190,
3 grams of tetraethylene pentamine,
Varying quantities of formaldehyde added as a 55% solution in aqueous methanol (55% $CH_2O$, 34% $CH_3OH$, 11% $H_2O$).

The various samples were tested for dry adhesion according to ASTM D–1344–57, and a simulated weathering test, conducted according to commercial standards test No. 253–63 which is a modified ASTM D–1344–57 test, wherein each sample is subjected to exposure to water at 25°C and ≤ 25 inches Hg vacuum for 30 minutes followed by exposure to water at 60 psi for an additional 30 minutes and subsequently testing the sample while wet.

The impact resistance was tested according to ASTM D–950–54.

The T-gel times were tested according to ASTM D–2471–68 and is a measure of the cure rate wherein the shorter T gel time indicates a faster cure rate.

The quantities of formaldehyde and results are given in the following Table I.

TABLE I

| Test No. | Wt. Ratio of Epoxy Resin/ Formaldehyde Solution | Wt. Ratio of Epoxy Resin/ Formaldehyde | T Gel Time Min. | Dry ASTM D-1344-57 | | Wet CS 253-63 | | Impact Ft. lb/in² |
|---|---|---|---|---|---|---|---|---|
| | | | | Tensile psi | Wood Failure % | Tensile psi | Wood Failure % | |
| 1 (Control) | 1/0 | 1/0 | 80 | 315–325 | 90–100 | 65–150 | 0–10 | 9.1 |
| 2 | 20/1 | 36.3/1 | 70 | 235–265 | 95–100 | 85–145 | 0–20 | 10.2 |
| 3 | 10/1 | 18.2/1 | 15 | 280–305 | 95–100 | 65–175 | 2–40 | >12.0 |
| 4 | 7/1 | 12.7/1 | 2 | 160–220 | 95–100 | N.T.* | N.T. | 8.8 |
| 5 | 5/1 | 9/1 | 1 | 200–280 | 100 | 65–125 | 0–60 | 8.1 |
| 6 | 4/1 | 7.3/1 | 1 | 165–215 | 100 | 120–145 | 30–60 | 9.6 |
| 7 | 2/1 | 3.6/1 | 0.5 | Too fast for practical use without the use of mechanical mixing and application equipment. | | | | |

* N.T. = not tested

EXAMPLE 2

A glycidyl ether of bisphenol A having an EEW of about 190 was mixed with a 55 percent solution by weight of formaldehyde in aqueous methanol in a weight ratio of 4 parts of epoxy resin per 1 part by weight of formaldehyde solution. The T gel time for this mixture was >24 months.

The above example demonstrates that an epoxy resin composition mixed with formaldehyde solution has excellent room temperature stability.

EXAMPLE 3

A mixture of 5 grams of a diglycidyl ether of bisphenol A having an EEW of about 190 was mixed with 0.7 gram of a 55 percent solution of formaldehyde in an aqueous methanol solution (55% $CH_2O$, 34% $CH_3OH$, 11% $H_2O$). To this was added 3 grams of an amine compound. The amine compounds and room temperature T gel time are given in the following Table II.

TABLE II

| Amine Compound | Room Temp. T Gel Time (Min.) |
| --- | --- |
| 60/40 mixture of | |
| 2,4'-/4,4'-oxydianiline | 20 |
| 4,4'-methylenedianiline | 50 |
| D.E.H. 14* | 35 |

*D.E.H. 14 is a polyamide curing agent having a viscosity at 40°C of about 200–600 cps.

EXAMPLE 4

A glycidyl ether of bisphenol A having an EEW of about 190 in an amount of 5 grams was mixed with 1.4 grams 37 percent aqueous solution of formaldehyde. To this was added 3 grams of tetraethylenepentamine. The T gel time of this mixture was 2.5 minutes.

I claim:

1. A room temperature stable epoxy resin composition comprising
   A. an epoxy resin having an average of more than one glycidyl ether group per molecule and
   B. formaldehyde, linear or cyclic polymers thereof, or an adduct of formaldehyde with a compound containing a plurality of aliphatic hydroxyl groups;
   wherein the weight ratio of epoxy resin:formaldehyde is from about 3.6:1 to about 36:1 and wherein component B is dissolved in a solvent selected from water, alcohols, or monoethers of ethylene polyglycols and propylene polyglycols.

2. The composition of claim 1 wherein the ratio of epoxy resin:formaldehyde is from about 9:1 to about 18:1.

3. The composition of claim 2 wherein component B is formaldehyde.

4. The composition of claim 3 wherein the formaldehyde is in an alcoholic solution.

5. The composition of claim 4 wherein the alcohol is methanol.

6. A curable epoxy resin composition comprising
   A. an epoxy resin having an average of more than one glycidyl ether group per molecule,
   B. a compound having an average of more than one primary amine group per molecule and
   C. formaldehyde or a compound capable of releasing formaldehyde at a temperature below about 50°C.;
   wherein the weight ratio of epoxy formaldehyde or the amount of formaldehyde releasable from said compound capable of releasing formaldehyde of from about 3.6:1 to about 36:1 and the weight ratio of A:B is from about 0.3:1 to about 3:1 and wherein component C is dissolved in a solvent selected from water, alcohols, or monoethers of ethylene polyglycols and propylene polyglycols.

7. The composition of claim 6 wherein the epoxy resin: formaldehyde or formaldehyde releasable from said compound capable of releasing formaldehyde is from about 9:1 to about 18:1 and the weight ratio of A:B is from about 1.3:1 to about 2:1.

8. The composition of claim 7 wherein component C is formaldehyde.

9. The composition of claim 8 wherein the formaldehyde is in an alcoholic solution.

10. In a process for the ambient temperature curing of an epoxy resin having an average of more than one glycidyl ether group per molecule with a compound having an average of more than one primary amine group per molecule, the improvement which comprises curing in the presence of formaldehyde or a compound capable of releasing formaldehyde dissolved in a solvent selected from water, alcohol, or monoethers of ethylene polyglycols and propylene glycols at a temperature of less than about 50°C. wherein the weight ratio of epoxy resin:formaldehyde or compound capable of releasing formaldehyde is from about 3.6:1 to about 36:1.

* * * * *